United States Patent
Ogikubo et al.

(10) Patent No.: US 10,587,172 B2
(45) Date of Patent: Mar. 10, 2020

(54) MANUFACTURING METHOD FOR LAMINATED IRON CORE AND MANUFACTURING DEVICE FOR LAMINATED IRON CORE

(71) Applicant: KURODA PRECISION INDUSTRIES LTD., Kanagawa (JP)

(72) Inventors: Tomohiro Ogikubo, Kanagawa (JP); Tatsuhiro Yoshida, Kanagawa (JP); Noriyuki Hosokawa, Kanagawa (JP)

(73) Assignee: KURODA PRECISION INDUSTRIES LTD., Kanagawa (JP)

( * ) Notice: Subject to any disclaimer, the term of this patent is extended or adjusted under 35 U.S.C. 154(b) by 222 days.

(21) Appl. No.: 15/556,894

(22) PCT Filed: Mar. 16, 2015

(86) PCT No.: PCT/JP2015/001448
§ 371 (c)(1),
(2) Date: Sep. 8, 2017

(87) PCT Pub. No.: WO2016/147214
PCT Pub. Date: Sep. 22, 2016

(65) Prior Publication Data
US 2018/0026501 A1 Jan. 25, 2018

(51) Int. Cl.
*H02K 15/02* (2006.01)
*B21D 28/06* (2006.01)
*B21D 28/10* (2006.01)
*H02K 1/14* (2006.01)

(52) U.S. Cl.
CPC .......... *H02K 15/022* (2013.01); *B21D 28/06* (2013.01); *B21D 28/10* (2013.01); *H02K 1/148* (2013.01)

(58) Field of Classification Search
CPC ......... H02K 1/148; B21D 28/10; B21D 28/06
See application file for complete search history.

(56) References Cited

FOREIGN PATENT DOCUMENTS

| JP | H0998545 | | 4/1997 |
|---|---|---|---|
| JP | 2010028959 | | 2/2010 |
| JP | 201017487 | | 8/2010 |
| JP | 2010178487 A | * | 8/2010 |
| JP | 2013207804 | | 10/2013 |

OTHER PUBLICATIONS

International Search Report for PCT/JP2015/001448 dated Jun. 16, 2015, 2 pages.

* cited by examiner

*Primary Examiner* — Livius R. Cazan
(74) *Attorney, Agent, or Firm* — Dority & Manning, P.A.

(57) ABSTRACT

A method of manufacturing a divided laminated iron core, wherein the iron core laminae includes first iron core laminae and second iron core laminae, includes: a first connecting-portion punching step of punching each of connecting portions between divided iron core pieces constituting each first iron core lamina in a sheet steel strip; a second connecting-portion punching step of punching each of connecting portions between divided iron core pieces constituting each second iron core lamina; and a stacking step of stacking at least one of the first iron core laminae and at least one of the second iron core laminae and joining together the stacked iron core laminae, wherein the connecting portions between the divided iron core pieces of each first iron core lamina are configured to be separated more easily than the connecting portions between the divided iron core pieces of each second iron core lamina.

19 Claims, 16 Drawing Sheets

Fig.8
(A) 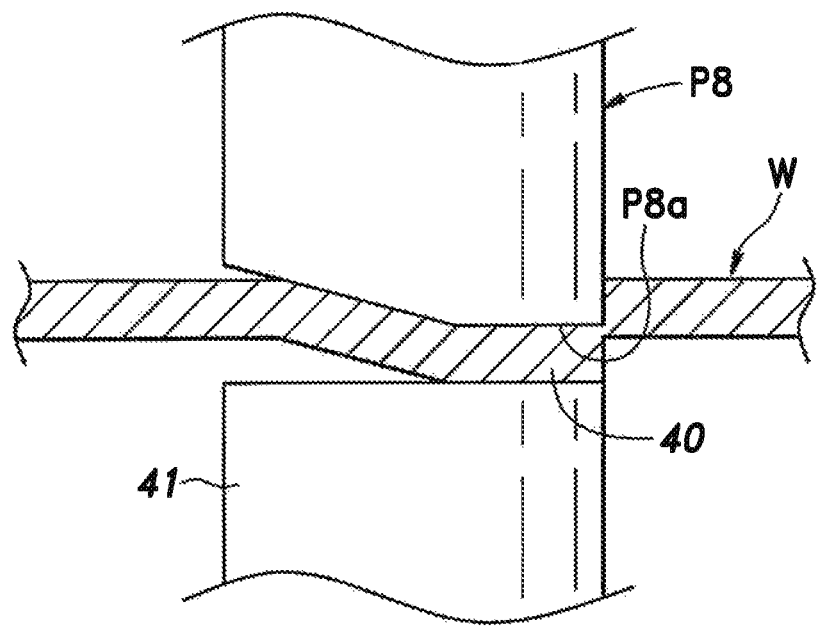
(B) 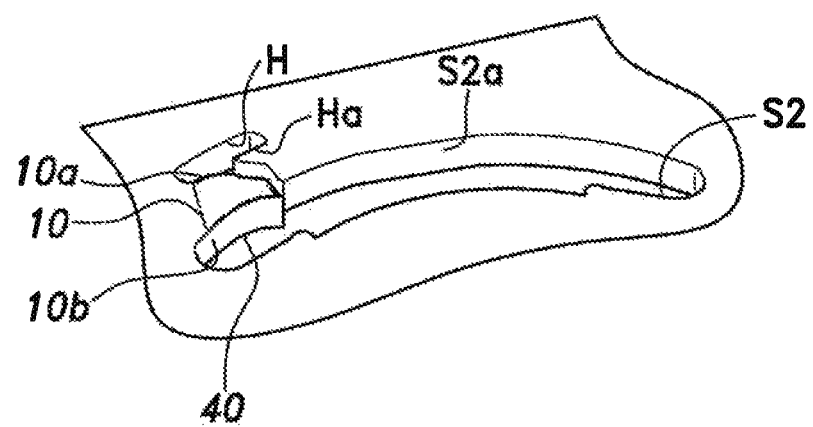

Fig. 14
(A) 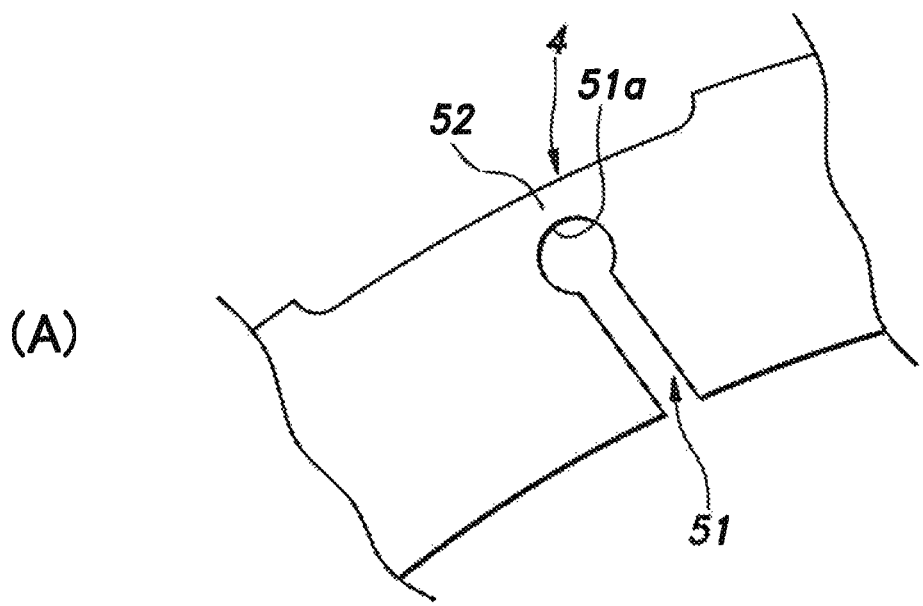
(B) 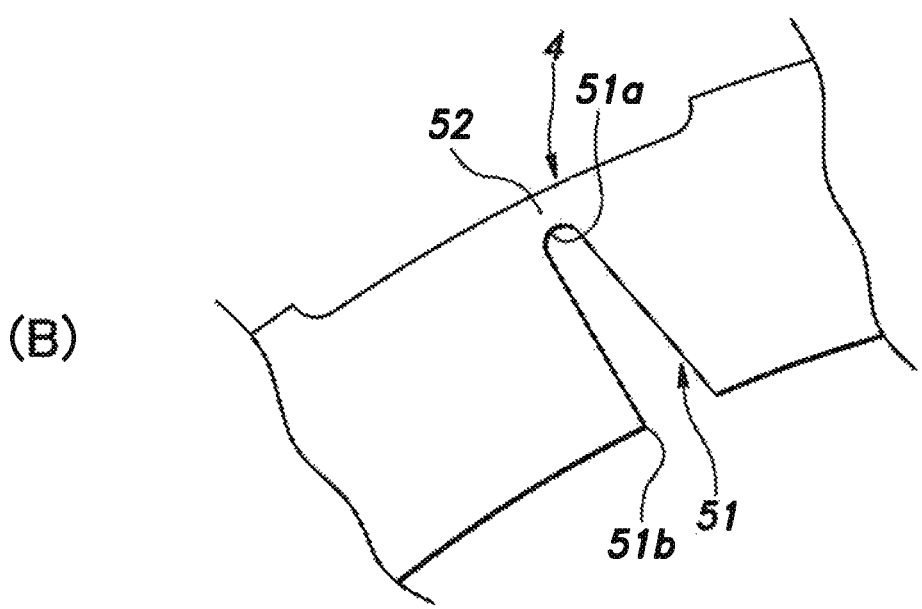

MANUFACTURING METHOD FOR LAMINATED IRON CORE AND MANUFACTURING DEVICE FOR LAMINATED IRON CORE

TECHNICAL FIELD

The present invention relates to a manufacture method for a laminated iron core to be used in a stator or a rotor of a motor, a power generator or the like and a manufacturing device for a laminated iron core.

BACKGROUND ART

Conventionally, a laminated iron core is typically manufactured by processing a strip of electromagnetic steel sheet in coil form (sheet steel strip) by using a progressive die machine. In a progressive die machine, locating holes, slots, and inner teeth are punched out in a steel sheet strip in a sequential manner so as to form various parts of each iron core lamina, and a prescribed number of blanked iron core laminae are bonded to one another to form a laminated iron core. However, when a wire is wound on magnetic pole portions projecting from an inner periphery of a stator core consisting of a laminated iron core, for example, because a space for inserting a winding jig is limited, there is an inconvenience such as that it is difficult to increase the number of the magnetic poles (coils) and/or the number of turns of the wound wire.

To address such a problem, a divided laminated iron core, which is formed by punching, from a sheet steel strip, iron core laminae each having a plurality of core pieces (divided iron core pieces) connected with each other in the circumferential direction and by stacking a plurality of the iron core laminae, has been developed, and, for example, a method for manufacturing a stator core having a ring-shaped yoke and a predetermined number of teeth projecting inward of the yoke by connecting a plurality of divided core pieces, each having a yoke portion and a tooth portion, with each other in an endless manner, and a progressive die machine used in the manufacture of such a stator core are known (see Patent Document 1).

PRIOR ART DOCUMENT(S)

Patent Document(s)

Patent Document 1: JP2010-178487A

SUMMARY OF THE INVENTION

Tack to be Accomplished by the Invention

Incidentally, in the conventional technology described in the aforementioned Patent Document 1, when a wire is wound on the magnetic pole portions of the manufactured stator core, it is necessary to separate the stacks of core pieces from each other, and therefore, the connection strength between the core pieces needs to be small such that the stacks thereof can be easily separated from each other. On the other hand, if the connection strength between the core pieces is too small, the stacks of the core pieces may be separated from each other inadvertently after the manufacture of the stator core, and this would hinder the handling of the stator core by a worker or the like.

The present invention is made in view of such problems in the prior art, and a primary object thereof is to provide a manufacturing method for a laminated iron core and a manufacturing device for a laminated iron core which, in a divided laminated iron core constituted of iron core laminae each having a plurality of divided iron core pieces connected with each other in the circumferential direction, allow the connection strength between the divided iron core pieces to be adjusted easily.

Means to Accomplish the Task

According to a first aspect of the present invention, there is provided a method for manufacturing a divided laminated iron core (3) by punching iron core laminae (7) from a sheet steel strip (W) such that each iron core lamina includes a plurality of divided iron core pieces (7a, 7b) connected with each other in a circumferential direction, and stacking a plurality of the iron core laminae, wherein the iron core laminae include first iron core laminae and second iron core laminae, the method comprising: a first connecting-portion punching step of punching connecting portions between divided iron core pieces constituting each first iron core lamina, in the sheet steel strip; a second connecting-portion punching step of punching connecting portions between divided iron core pieces constituting each second iron core lamina, in the sheet steel strip; and a stacking step of stacking at least one of the first iron core laminae and at least one of the second iron core laminae and joining together the stacked iron core laminae, wherein the connecting portions between the divided iron core pieces of each first iron core lamina are configured to be separated more easily than the connecting portions between the divided iron core pieces of each second iron core lamina.

In the manufacturing method for a divided laminated iron core according to the first aspect, in the divided laminated iron core constituted of iron core laminae each having a plurality of divided iron core pieces connected with each other in the circumferential direction, the connecting portions of each first iron core lamina are provided to be capable of being separated more easily than the connecting portions of each second iron core lamina (namely, the divided laminated iron core is constituted of a plurality of iron core laminae having mutually different connection strengths between the divided iron core pieces), and therefore, it is possible to easily adjust the connection strength between the divided iron core pieces (and hence the stacks thereof) by varying the numbers (composition ratio) and positions of the first iron core laminae and the second iron core laminae constituting the divided laminated iron core.

According to a second aspect of the present invention, with regard to the aforementioned first aspect, the first connecting-portion punching step includes full punching for dividing each of the connecting portions of each first iron core lamina along a first dividing line (5), and the second connecting-portion punching step includes partial punching for dividing each of the connecting portions of each second iron core lamina along a second dividing line (5).

In the manufacturing method for a divided laminated iron core according to the second aspect, because each of the connecting portions of the first iron core laminae is formed by full punching and each of the connecting portions of the second iron core laminae is formed by partial punching, it is possible to make the connecting portions of the first iron core laminae easier to be separated than the connecting portions of the second iron core laminae by a simple method.

According to a third aspect of the present invention, with regard to the aforementioned first aspect, the first connecting-portion punching step includes punching for dividing each of the connecting portions of each first iron core lamina along a first dividing line (5), and the second connecting-portion punching step includes punching for forming a slit (51) in each of the connecting portions of each second iron core lamina.

In the manufacturing method for a divided laminated iron core according to the third aspect, by performing punching for forming a slit in each of the connecting portions of each second iron core lamina (namely, by narrowing the width of each connecting portion than the other portions without dividing the connecting portion), it is possible to more reliably prevent the divided iron core pieces (and hence the stacks thereof) in the manufactured divided laminated iron core from being separated from each other inadvertently.

According to a fourth aspect of the present invention, with regard to the aforementioned second or third aspect, the first dividing line consists of a straight line.

In the manufacturing method for a divided laminated iron core according to the fourth aspect, because the first dividing line consists of a straight line, it is possible to suppress distortion and stress concentration at the connecting portions between the divided iron core pieces as well as performance degradation (iron loss increase), while preventing the divided iron core pieces in the manufactured divided laminated iron core from being separated from each other inadvertently.

According to a fifth aspect of the present invention, with regard to any one of the aforementioned first to fourth aspects, a punching shape of the connecting portions of the first iron core laminae obtained by the first connecting-portion punching step is different from a punching shape of the connecting portions of the second iron core laminae obtained by the second connecting-portion punching step.

In the manufacturing method for a divided laminated iron core according to the fifth aspect, by making the punching shape of the connecting portions of the first iron core laminae different from the punching shape of the connecting portions of the second iron core laminae, it is possible to make the connecting portions of the first iron core laminae easier to be separated than the connecting portions of the second iron core laminae by a simple method.

According to a sixth aspect of the present invention, with regard to any one of the aforementioned first to fifth aspects, one of the second iron core laminae is disposed at an uppermost or lowermost layer of the laminated iron core.

In the manufacturing method for a divided laminated iron core according to the sixth aspect, when the manufactured laminated iron core is separated, a high shear force can be easily applied to the second iron core lamina disposed at the uppermost or lowermost layer (namely, an iron core lamina having a higher connection strength of the connecting portions between the divided iron core pieces than the other iron core laminae), and therefore, the manufactured laminated iron core can be separated into parts easily.

According to a seventh aspect of the present invention, with regard to any one of the aforementioned first to fifth aspects, the first connecting-portion punching step and the second connecting-portion punching step are performed by a same punch (P8) configured to selectively perform punching for the first connecting-portion punching step and punching for the second connecting-portion punching step.

In the manufacturing method for a divided laminated iron core according to the seventh aspect, because the first and second connecting portion-punching steps are performed by a same punching section (punch), the connection strength between the divided iron core pieces can be adjusted easily with a simple device structure.

According to an eighth aspect of the present invention, there is provided a device (1) for manufacturing a divided laminated iron core (3) by punching iron core laminae (7) from a sheet steel strip (W) such that each iron core lamina includes a plurality of divided iron core pieces (7a, 7b) connected with each other in a circumferential direction, and stacking a plurality of the iron core laminae, wherein the iron core laminae include first iron core laminae and second iron core laminae, the device comprising: a first connecting portion-punching section for punching connecting portions between divided iron core pieces constituting each first iron core lamina, in the sheet steel strip; a second connecting portion-punching section for punching connecting portions between divided iron core pieces constituting each second iron core lamina, in the sheet steel strip; and a stacking section for stacking at least one of the first iron core laminae and at least one of the second iron core laminae and joining together the stacked iron core laminae, wherein the connecting portions between the divided iron core pieces of each first iron core lamina are configured to be separated more easily than the connecting portions between the divided iron core pieces of each second iron core lamina.

Effect of the Invention

As described above, according to the present invention, it is possible, in a divided laminated iron core constituted of iron core laminae each having a plurality of divided iron core pieces connected with each other in the circumferential direction, to allow the connection strength between the divided iron core pieces to be adjusted easily.

BRIEF DESCRIPTION OF THE DRAWINGS

FIG. 8 is an explanatory diagram of partial punching in step (8) of the first embodiment;

FIG. 14 is a plan view showing a modification of the connecting portion of the stator core piece shown in FIG. 13;

DESCRIPTION OF THE PREFERRED EMBODIMENT(S)

Embodiments of the present invention are described in the following reference to the appended drawings.

First Embodiment

Figure 1:
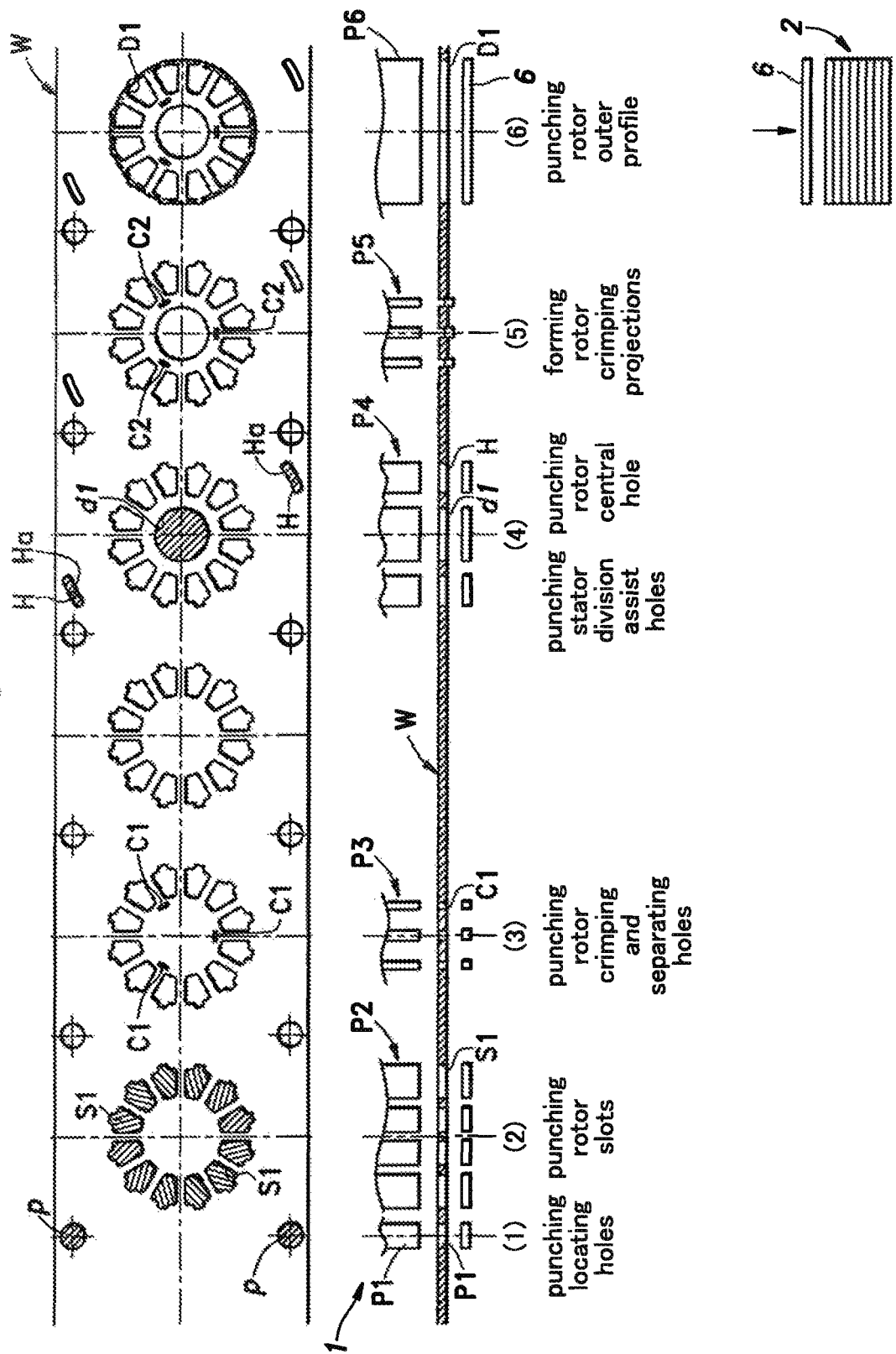
FIG. 1 is an explanatory diagram showing a part of a progressive die machine and the strip layout thereof according to a first embodiment.
Figure 2:
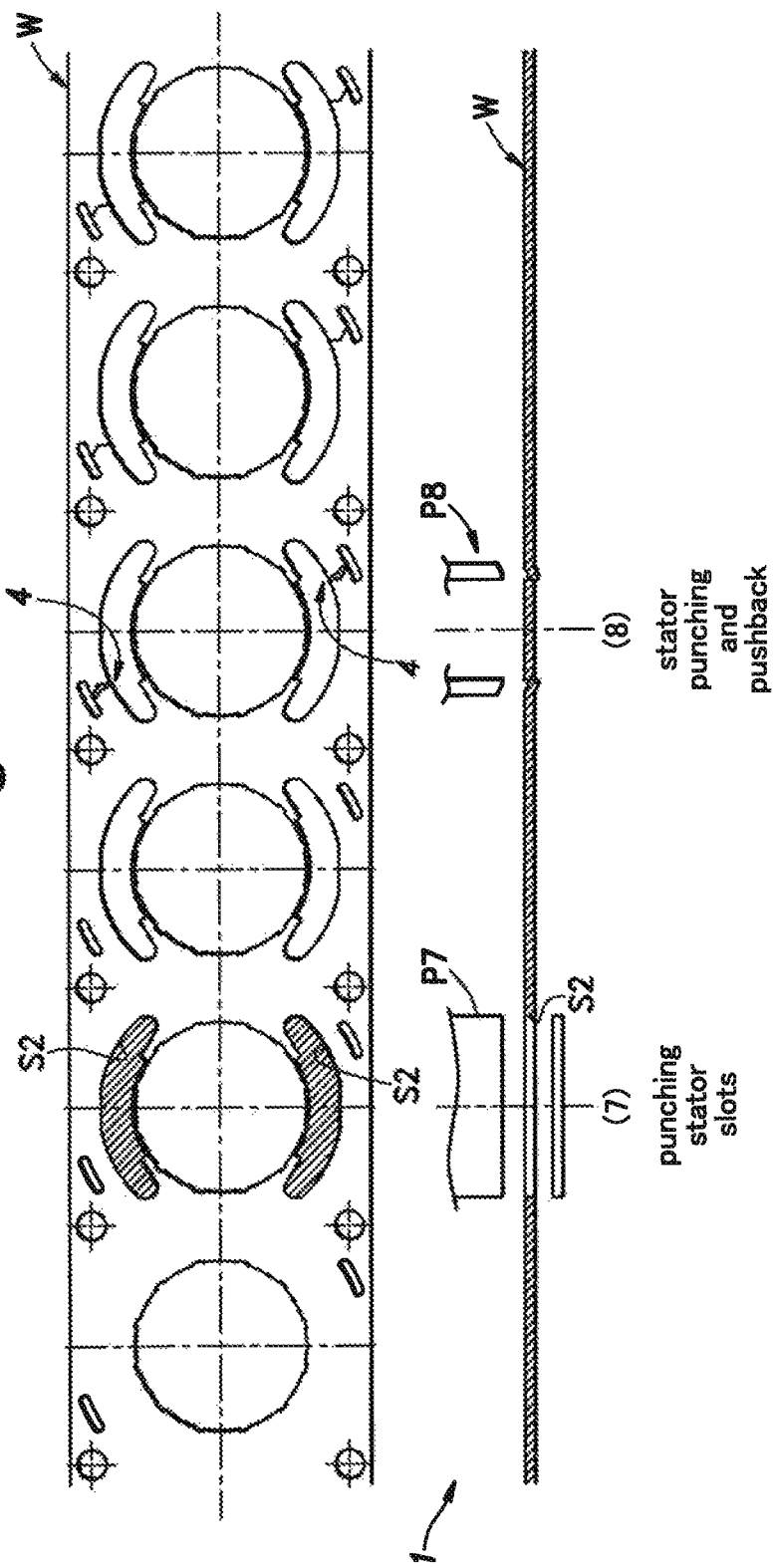
FIG. 2 is an explanatory diagram showing a part of the progressive die machine and the strip layout thereof according to the first embodiment.
Figure 3:
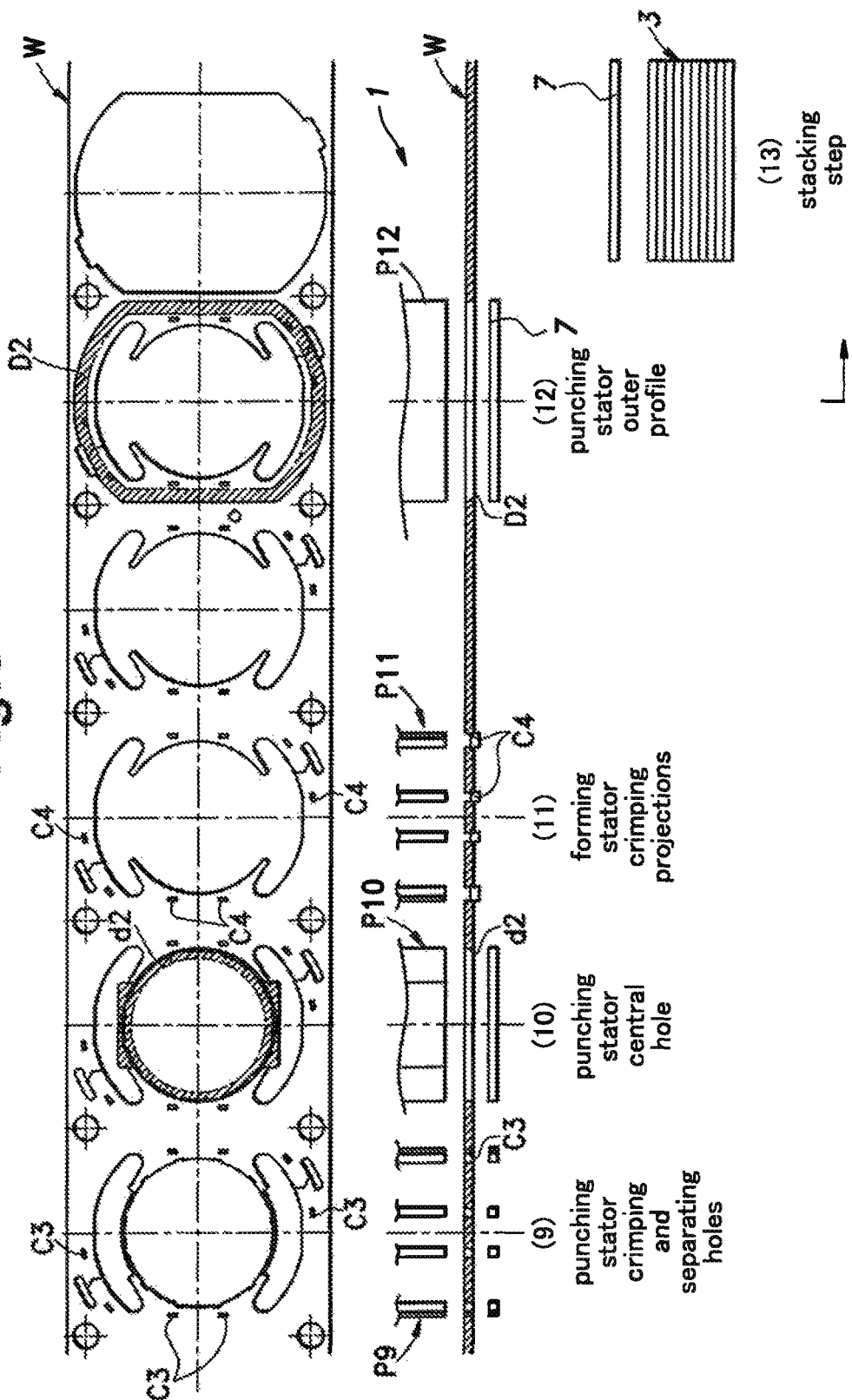
FIG. 3 is an explanatory diagram showing a part of the progressive die machine and the strip layout thereof according to the first embodiment.
Figure 4:
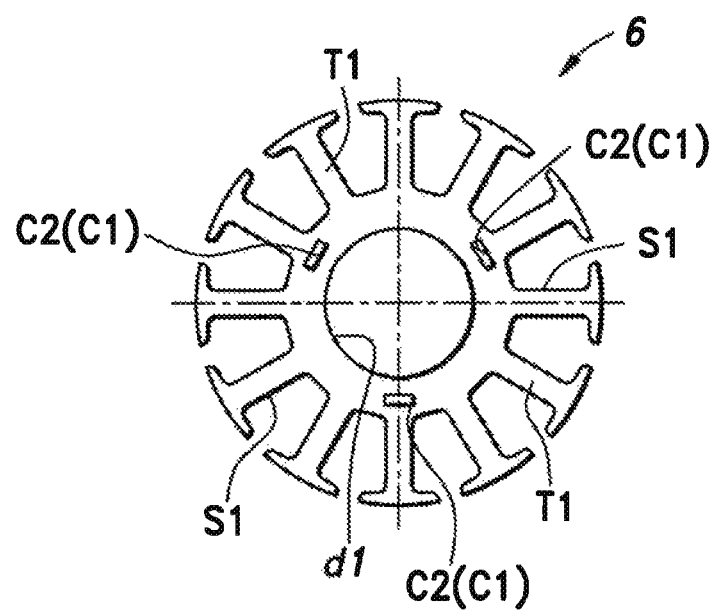
FIG. 4 is a plan view of a rotor core piece of the first embodiment.
Figure 5:
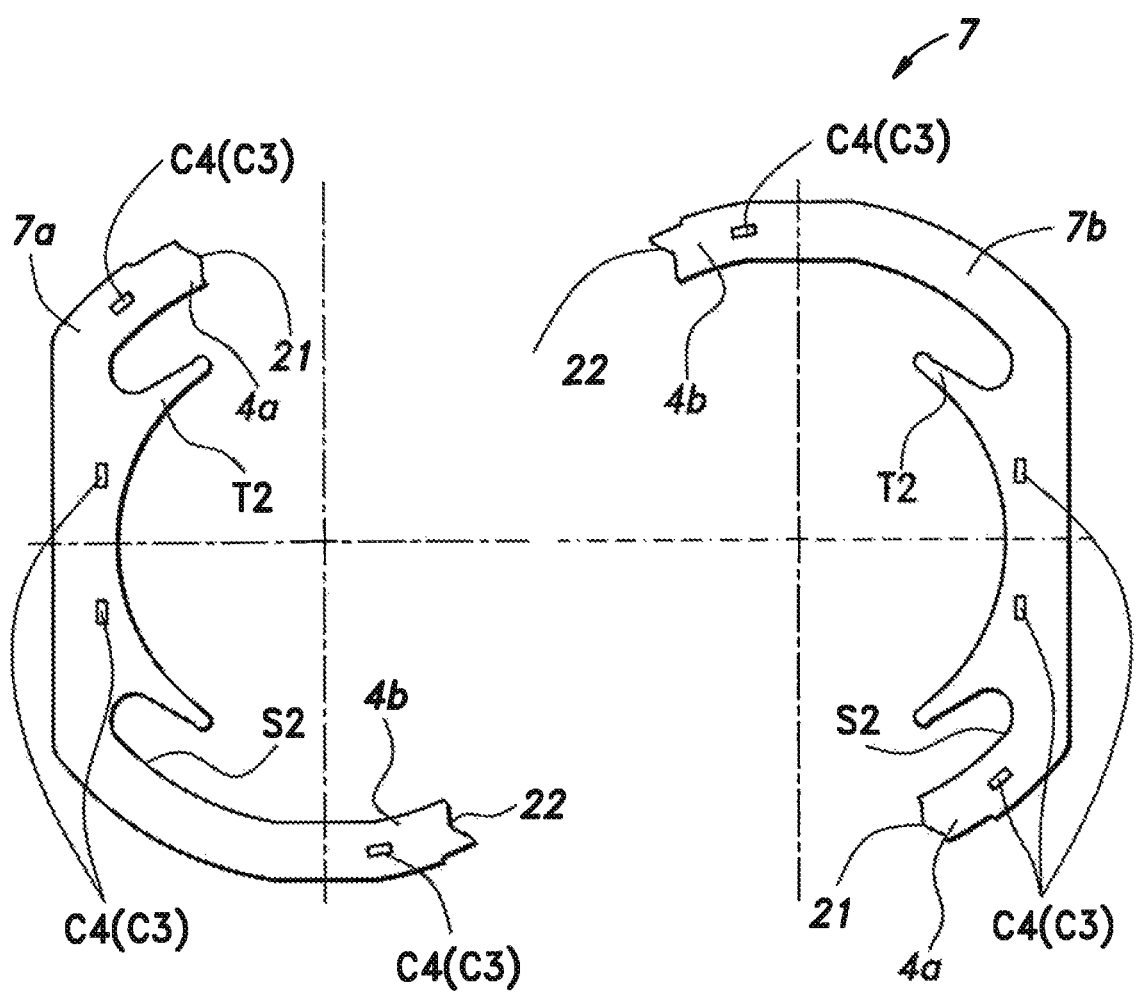
FIG. 5 is a plan view of a stator core piece (in a separated state) of the first embodiment.
Figure 6:
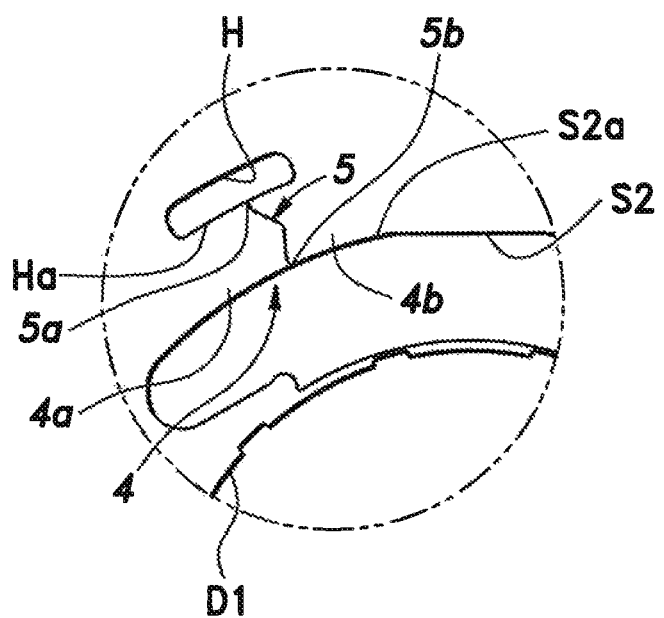
FIG. 6 is an enlarged view showing a connecting portion of the stator core piece of the first embodiment.
Figure 7:
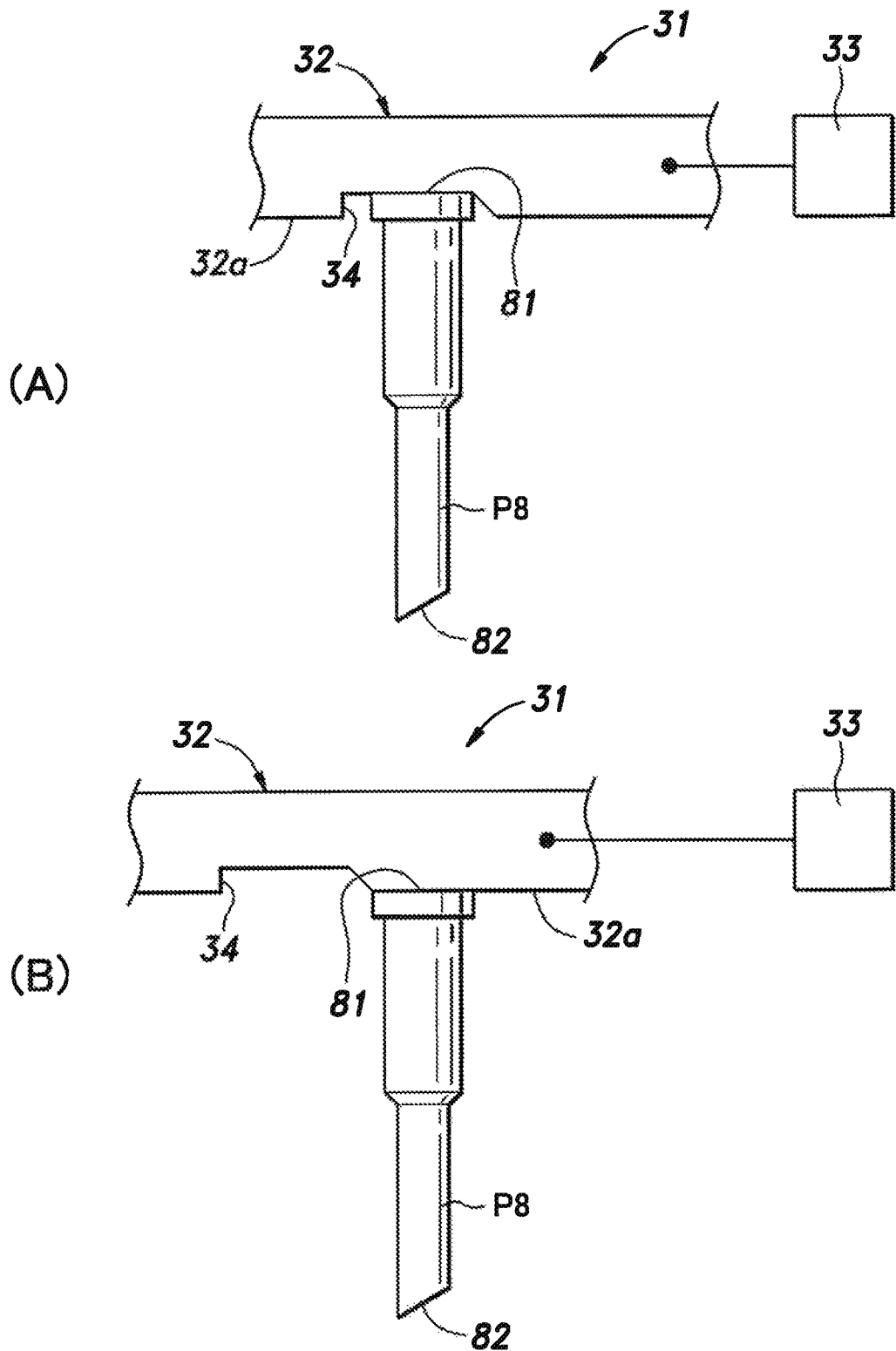
FIG. 7 is a schematic diagram of a cam mechanism provided to the progressive die machine of the first embodiment.
Figure 9:
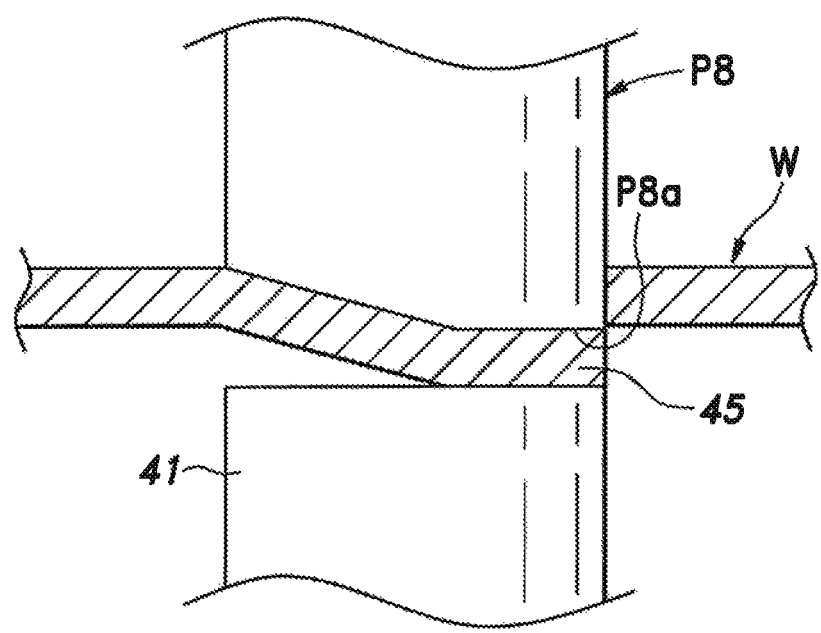
FIG. 9 is n explanatory diagram of full punching in step (8) of the first embodiment.
Figure 10:
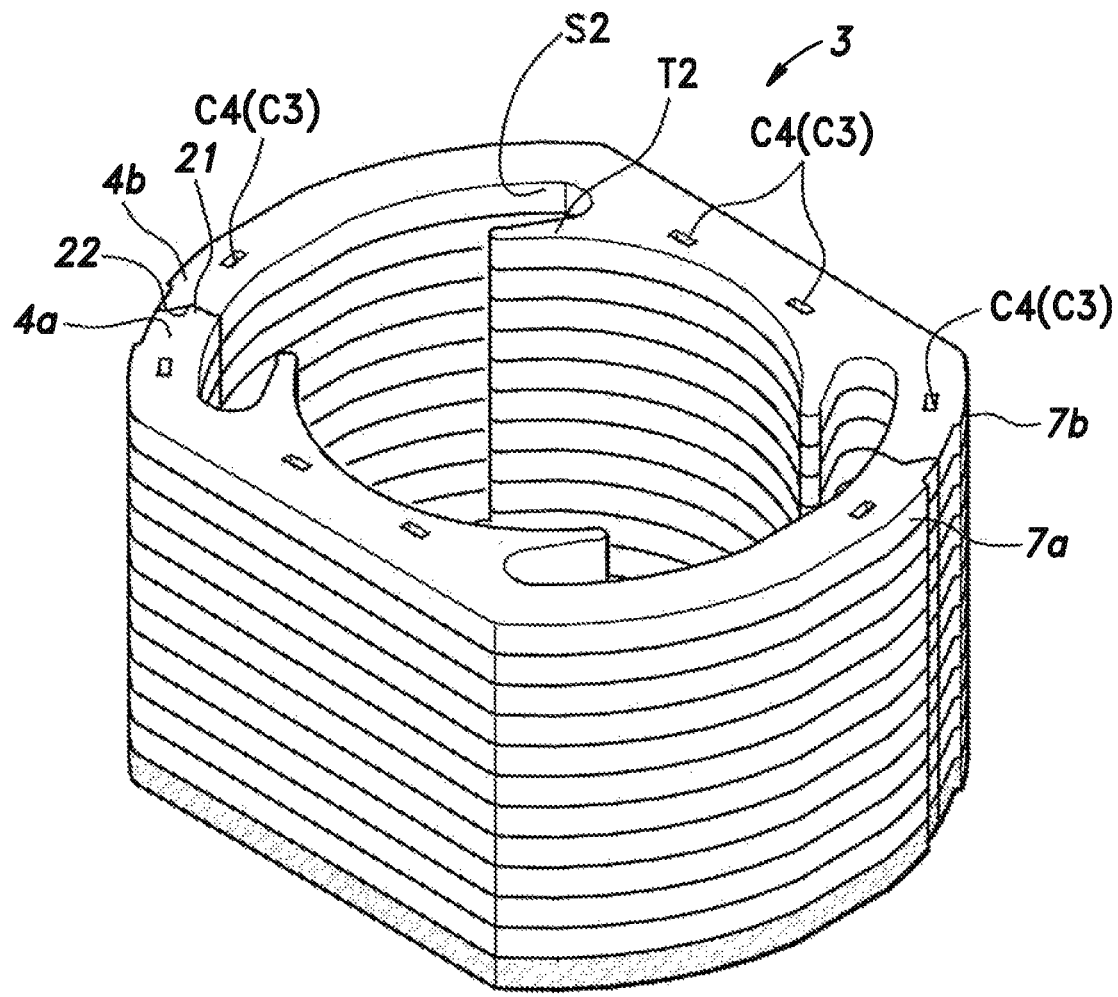
FIG. 10 is a perspective view of a stator core of the first embodiment.

FIGS. 1, 2 and 3 are each an explanatory diagram showing a part of a progressive die machine 1 and the strip layout thereof according to the first embodiment of the present invention, FIG. 4 is a plan view showing a blanked rotor core piece 6, FIG. 5 is a plan view showing a blanked stator core piece 7 (in a separated state), FIG. 6 is an enlarged view showing a connecting portion of the stator core piece 7, FIG. 7 is a schematic diagram of a cam mechanism 31 provided to the progressive die machine 1, FIG. 8 is an explanatory diagram of partial punching in step (8), FIG. 9 is an explanatory diagram of full punching in step (8), and FIG. 10 is a perspective view of a stator core 3. FIGS. 1 to 3 show a series of strip layouts. Also, only punches P1 to P6 are shown as main structural elements of the progressive die machine 1.

As shown in FIGS. 1 to 3, a steel sheet strip W in coil form is processed sequentially by a plurality of steps (1) to (13) while being conveyed in an intermittent manner in a progressive die machine (manufacturing device for a laminated iron core) 1.

In FIG. 1, steps (1) to (6) in the first half show a process for punching rotor core pieces 6 (see FIG. 4) for constituting a rotor core 2 for a motor and stacking them sequentially. In this process for punching the rotor core pieces 6, by using punches P1 to P6 attached to an upper metallic die assembly of the progressive die machine 1 and corresponding dies provided on a lower metallic die assembly, the following steps are performed sequentially: (1) punching of locating holes p; (2) punching of slots S1 of each rotor core piece 6; (3) punching of crimping and separating holes C1 for an iron core lamina for separation in the rotor core 2 (namely, an iron core lamina positioned at the lowermost layer of the rotor core 2); (4) punching of a central hole d1 of each rotor core piece 6; (5) punching for forming crimping portions C2 (here, a partially punched dowel-shaped portion having an upper recess and a lower projection) for each iron core lamina in the rotor core 2 other than the iron core lamina for separation; and (6) punching of an outer profile D1 of each rotor core piece 6 (formation of teeth T1). After step (6), the rotor core pieces 6 are stacked in a manner similar to that in later-described step (13).

In the aforementioned step (4), at the same time with the punching of the central hole d1 of the rotor core piece 6, two division assist holes H for a later-described stator core piece 7 are punched out. The division assist holes H each consist of an elongated hole (through hole) curved to extend along the circumferential direction and are located symmetrically with respect to the center of the rotor core piece 6. Further, each division assist hole H is provided such that an inner edge Ha thereof overlaps with a part of an outer profile D2 (see FIG. 3) of the stator core piece 7. It is to be noted that step (4) may be omitted as necessary.

In FIGS. 2 and 3, steps (7) to (13) in the second half show a process for punching stator core pieces 7 (see FIG. 5) as iron core laminae for constituting a stator core 3 (laminated iron core) for a motor, and stacking them sequentially. In this process for punching the stator core pieces 7, by using punches P7 to P12 attached to the upper metallic die assembly of the progressive die machine 1 and corresponding dies provided on the lower metallic die assembly, the following steps are performed sequentially: (7) punching of slots S2 of each stator core piece 7; (8) punching (partial punching and pushback, or full punching and pushback) for dividing each connecting portion 4 of the stator core piece 7 while maintaining a connected state thereof; (9) punching of crimping and separating holes C3 for an iron core lamina for separation in the stator core 3 (namely, an iron core lamina located at the lowermost layer of the stator core 3); (10) punching of a central hole d2 of each stator core piece 7 (formation of teeth T2); (11) punching for forming crimping portions C4 for each iron core lamina in the stator core 3 other than the iron core lamina for separation; (12) punching of an outer profile D2 of each stator core piece 7; and (13) stacking of the blanked iron core laminae (stator core pieces 7 in the connected state). It is to be noted that an idle stage may be provided between the above steps (1) to (13) as appropriate.

As also shown in FIG. 6, the aforementioned step (8) is a dividing step for dividing each connecting portion 4 of the stator core piece 7 along a dividing line 5. The dividing line 5 extends substantially radially, and is located such that an outer end 5a thereof intersects with the inner edge Ha of the associated division assist hole 14, and an inner end 5b thereof intersects with an outer edge S2a of the associated slot S2. As also shown in FIG. 5, the stator core piece 7 is constituted of first and second divided iron core pieces 7a, 7b. Each connecting portion 4 of the stator core piece 7 is divided into a first connecting end 4a of the first divided iron core piece 7a having a protruding portion 21 protruding in the circumferential direction and a second connecting end 4b of the second divided iron core piece 7b having a recessed portion 22 with a shape complementary to the protruding portion 21, and the two divided iron core pieces 7a, 7b are connected with each other by fitting these portions with each other.

Further, as shown in FIG. 7, in step (8), a cam mechanism 31 for selectively carrying out a punching operation of a dividing punch P8 for dividing the connecting portion 4 of the stator core piece 7 is used. The cam mechanism 31 includes a cam member 32 and a drive unit 33 for sliding the cam member 32 horizontally along an upper surface of a punch plate (not shown in the drawings). The bottom surface (cam face) 32a of the cam member 32 is provided with a recess 34 that can receive an upper end 81 of the dividing punch P8. As shown in FIG. 7(A), when the upper end 81 of the dividing punch P8 is received in the recess 34 of the cam member 32, a distal end 82 of the dividing punch P8 reaches a first punching position (partial punching position) at the time of punching (when moved downward) to perform later-described partial punching. On the other hand, when the cam member 32 is moved horizontally (leftward in FIG. 7(A)) such that the upper end 81 of the dividing punch P8 is placed out of the recess 34 and abuts on the bottom surface 32a of the cam member 32 as shown in FIG. 7(B), the distal end 82 of the dividing punch P8 reaches a second punching position (full punching position) at the time of punching (when moved downward) to perform later-described full punching (shearing).

More specifically, in a case where the dividing punch P8 carries out partial punching (second connecting-portion punching step) in step (8), an operation is performed to stop the downward movement of the distal end 82 of the dividing punch P8 at the first punching position in the middle of thickness of the steel sheet strip W as shown in FIG. 8(A). At this time, as also shown in FIG. 8(B), a partially punched piece (cut and raised piece) 40 projecting downward is formed by the partial punching at the connecting portion 4. Thereafter, the downward projecting partially punched piece 40 is pushed back by a pushing plate 41 that is spring-urged upward in the lower metallic die assembly (not shown in the drawings) so as to face the dividing punch P8 (namely, the partially punched piece 40 is pushed back to fit into the original position in the steel sheet strip W). Thereby, the left and side edges 10a, 10b of the partially punched region 10 (namely, portions continuous to the both ends of the dividing line 5) return to the original positions in the outer edge S2a of the slot S2 and the inner edge Ha of the division assist holes H, respectively.

On the other hand, in a case where the dividing punch P8 carries out full punching (first connecting-portion punching step) in step (8), an operation is performed to move the distal end 82 of the dividing punch P8 downward to the second punching position beyond the thickness of the steel sheet strip W as shown in FIG. 9. At this time, a fully punched piece (cut and raised piece) 45 completely separated at the dividing line 5 (see FIG. 6) is formed at the connecting portion 4. Thereafter, similarly to the case of the partial punching, the downward projecting fully punched piece 45 is pushed back by the pushing plate 41.

In the case where full punching is performed on the connecting portions 4 of the stator core piece 7 as described above, compared to the case where partial punching is performed on the connecting portions 4, the connection strength (here, tensile strength) at the connecting portions 4 of the stator core piece 7 becomes lower (namely, the divided iron core pieces 7a, 7b constituting the stator core piece 7 can be separated from each other more easily). Thus, by selectively performing the partial punching and full punching in step (8) in accordance with the punching operation of the dividing punch P8, two types of stator core pieces 7 (first and second iron core laminae) having varied connection strengths at the connecting portions 4 thereof are punched out at the progressive die machine 1.

The punching operation of the dividing punch P8 is selectively performed such that a single manufactured stator core 3 includes at least one stator core piece 7 processed with partial punching and at least one stator core piece 7 processed with full punching. For example, as shown in FIG. 10, in a single stator core 3, configuration may be made such that only the stator core piece 7 at the lowermost layer (colored in FIG. 10) is processed with partial punching, while all of the remaining upper stator core pieces 7 are processed with full punching. Conversely, it is also possible to process only the stator core piece 7 at the uppermost layer with partial punching. In this way, when the manufactured stator core 3 is separated, a high shear force can be produced easily in the stator core piece 7 at the uppermost or lowermost layer that has a high connection strength between the divided iron core pieces 7a, 7b, whereby the stator core 3 can be separated easily.

It is to be noted, however, that various modifications may be made on the positions and numbers of the stator core pieces 7 processed with partial punching and the stator core pieces 7 processed with full punching in the stator core 3, and with such modifications, it is possible to easily change the connection strength of the connecting portions 4 in the stator core 3. Further, though description was made here of an example in which two types of stator core pieces 7 processed with partial punching and full punching are punched out, the present invention is not limited to this, and for example, the configuration of the cam mechanism 31 may be modified so as to be able to perform different degrees of partial punching (namely, partial punching with different first punching positions for the distal end 82 of the dividing punch P8) to punch out two types of stator core pieces 7 having varied connection strengths of the connecting portions 4.

In the aforementioned step (13), the stator core pieces 7 punched out in step (12) are stacked sequentially in the die (not shown in the drawings) of the progressive die machine 1, and are pushed into a squeeze ring positioned below the die in a sequential manner. Thereby, the vertically adjoining stator core pieces 7 are brought into close contact with each other, and the crimping and separating holes C3 formed in the stator core piece 7 for separation and the crimping portions C4 formed in the stator core pieces 7 other than the stator core piece 7 for separation engage with each other between the iron core laminae, whereby the stator core 3 is formed as a stack of a prescribed number of stator core pieces 7 bonded with each other as shown in FIG. 10. In step (13), it is also possible to stack the stator core pieces 7 such that each stator core piece 7 is rotated by a prescribed angle relative to the previously stacked one or the stator core pieces 7 are given a prescribed skew angle.

Thus, according to the above-described progressive die machine 1 and the manufacturing method for the stator core 3 using the same, in the stator core 3 constituted of a plurality of divided iron core pieces 7a, 7b connected with each other in the circumferential direction, the connecting portions 4 of at least some of the stator core pieces 7 (first iron core laminae) are configured to be easier to be separated than the connecting portions of the other stator core pieces 7 (second iron core laminae) (namely, two types of stator core pieces 7 having mutually different connection strengths between the divided iron core pieces 7a, 7b are stacked), and therefore, it is possible to easily adjust the connection strength of the (entire) connecting portions 4 in the stator core 3 by varying the numbers (composition ratio) and positions of the stator core pieces 7 processed with partial punching and the stator core pieces 7 processed with full punching. Generally, in the laminated iron cores, the shape, number, thickness, etc. of the stacked iron core laminae may vary depending on the use thereof, and it is very difficult to adjust the connection strengths between the divided iron core pieces by changing the shape of the connecting portions of the iron core laminae having the same structure, but in the above-described progressive die machine 1 and the manufacturing method using the same, it is only necessary to adjust the positions and numbers of the two types of stator core pieces 7 having mutually different connection strengths between the divided iron core pieces.

Figure 11:
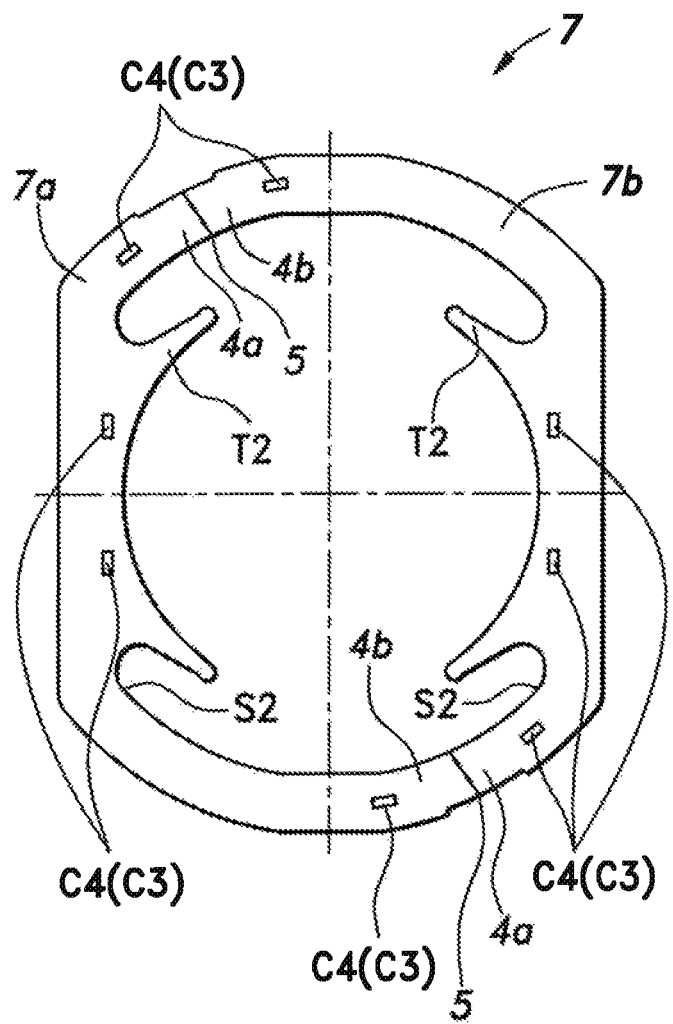
FIG. 11 is a plan view showing a modification of the division shape of the connecting portions in the stator core 3 of the first embodiment.

FIG. 11 is a plan view showing a modification of the division shape of the connecting portions 4 in the stator core 3. The division shape (shape of the dividing lines 5) of the connecting portions 4 in the stator core 3 is not limited to that shown in FIG. 5, etc. and various modifications are possible. Particularly, as shown in FIG. 11, it is preferred to adopt a division shape of the connecting portions 4 such that each dividing line 5 consists of a straight line. This makes it possible to suppress distortion and stress concentration at the first connecting end 4a and the second connecting end 4b of the divided iron core pieces 7a, 7b as well as performance degradation (iron loss increase) of the stator core 3, while preventing the stator core pieces 7 in the manufactured stator core 3 from being separated inadvertently.

In the foregoing example, the dividing line 5 has the same shape for the two types of stator core pieces 7 configured to have different connection strengths of the connecting portions 4 (namely, partially punched or fully punched), but in a case where the punching of the connecting portions 4 for the two types is not performed in the same step, the dividing line 5 may have different shapes.

Further, various modifications may be made on the overall shape of the stator core 3 (the overall external shape, the shapes of various parts such as the teeth and the yoke, the positions and number of the divisions in each stator core piece 7, etc.). For example, as shown in later-described FIGS. 15 and 16, configuration may be made such that a single divided iron core piece 7a, 7b has a single tooth T2.

Second Embodiment

Figure 12:
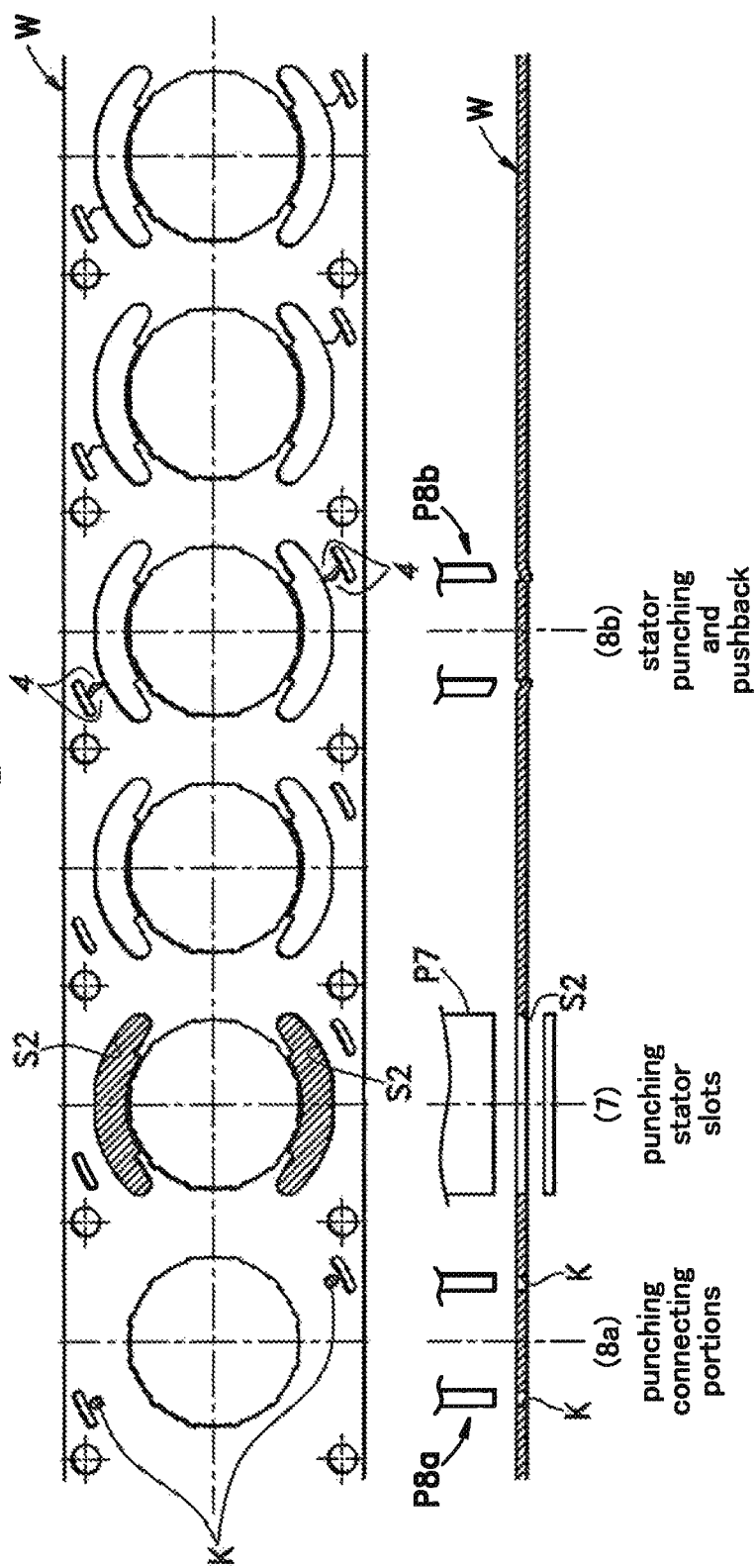
FIG. 12 is an explanatory diagram showing a part of a progressive die machine and the strip layout thereof according to the second embodiment.
Figure 13:
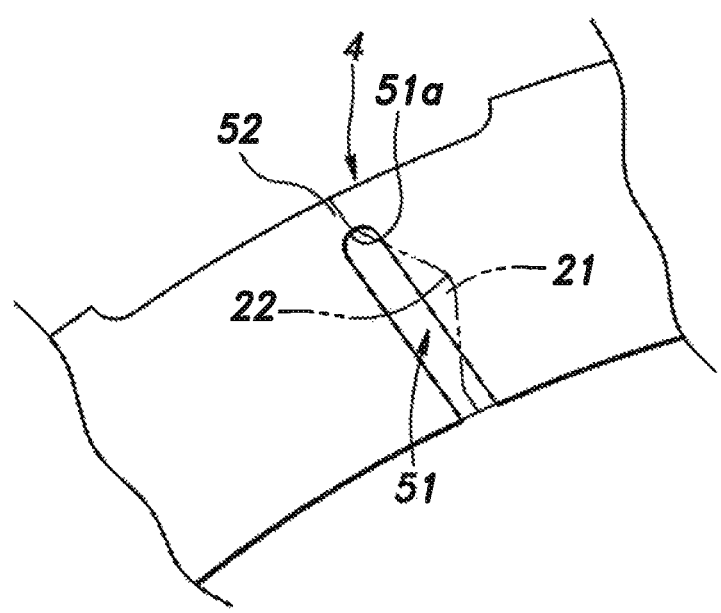
FIG. 13 is a plan view showing a connecting portion of a stator core piece according to the second embodiment.

FIG. 12 is an explanatory diagram showing a part of a progressive die machine 1 and the strip layout thereof according to the second embodiment of the present invention, FIG. 13 is a plan view showing a connecting portion of a stator core piece 7 in the stator core 3, and FIG. 14 is a plan view showing a modification of the connecting portion of the stator core piece 7 shown in FIG. 13. FIG. 13 is a diagram corresponding to FIG. 2 in the first embodiment described above. In FIGS. 13 and 14, structural elements similar to those of the first embodiment are denoted by the same reference signs. Also, with regard to the second embodiment, elements that are not particularly mentioned in the following are the same as those in the above-described first embodiment, and a detailed description thereof is omitted.

In the progressive die machine 1 and the manufacturing method for the stator core 3 according to the second embodiment, as a preceding step of step (7) in the first embodiment, (8a) punching of notch holes K for the connecting portions 4 by a punch P8a (step (8a)) is added. This punch P8a is provided with a cam mechanism similar to the cam mechanism 31 in the first embodiment described above, and the punching operation of the punch P8a is performed selectively, though it is selected here whether or not to perform the punching operation using the punch P8a. Further, as a post step of step (7), punching for dividing each connecting portion 4 of the stator core piece 7 with a punch P8b is performed (step (8b)) similarly to step (8) in the first embodiment, though in this embodiment the punch P8b performs only full punching (or partial punching) and it is selected by the cam mechanism whether or not to perform the full punching using the punch P8b.

In the aforementioned step (8a), as a result of punching of the notch holes K, a slit 51 extending from an inner peripheral edge toward an outer periphery of each connecting portion 4 of the stator core piece 7 is formed as shown in FIG. 13. The slit 51 is configured to have a circumferential width of about 1 mm, and a substantially semi-circular end 51a adjoining an outer peripheral edge of the connecting portion 4 via a region (hereinafter referred to as a "narrow portion 52") having a length of about 0.5 to 1.0 mm, for example. By forming the slit 51 as described above to thereby cause the connecting portion 4 to have a width (minimum width) smaller than the width of the other portion (outer peripheral edge portion of the stator core piece 7), the connecting portion 4 can be made easier to separate (namely, the connection strength can be lowered).

This step (8a) may be performed instead of partial punching (or full punching) in the first embodiment described above. Namely, this step may be performed selectively such that a single stator core 3 includes at least one stator core piece 7 formed with the notch holes K and at least one stator core pieces 7 not formed with the notch holes K. On the other hand, in step (8b), full punching (or partial punching) is performed on the stator core pieces 7 not formed with the notch holes K in step (8a). Thereby, as shown by imaginary lines in FIG. 13, each stator core piece 7 not formed with the notch holes K is provided with connecting portions 4 each divided into the protruding portion 21 and the recessed portion 22 at the positions corresponding to the aforementioned slits 51 (positions overlapping therewith in the axial direction of the rotor core 2). Thus, by forming the narrow portion 52 at each connecting portion 4 of some of the stator core pieces 7 constituting a single stator core 3 while performing full punching (or partial punching) on the connecting portions 4 of the other stator core pieces 7 similarly to the above-described first embodiment, it is possible, as in the first embodiment, to stack two types of stator core pieces 7 having mutually different connection strengths between the divided iron core pieces 7a, 7b. It is also possible to make a configuration such that a dividing line 5 as described above is formed in the narrow portion 52.

Thus, in the progressive die machine 1 and the manufacturing method for the stator core 3 according to the second embodiment, by varying the numbers (composition ratio) and positions of the stator core pieces 7 formed with the narrow portions 52 and the stator core pieces 7 processed with full punching (or partial punching), the connection strength of the (entire) connecting portions 4 in the stator core 3 can be adjusted easily.

It is to be noted that the shape of the notch holes K formed in step (8a) may be modified in various ways. For example, as shown in FIG. 14(A), the slit 51 may be configured to have a circumferential width of about 1 mm and a substantially circular end 51a with a diameter of about 2 mm.

Further, as shown in FIG. 14(B), for example, configuration may be made such that an open end 51b of the slit 51 has a largest width (for example, 2 mm) and the slit 51 is tapered toward the outer periphery. In this case, the end 51a may be substantially semi-circular similarly to that shown in FIG. 13.

Step (8a) was described above as an independent step, but when the notch holes K are formed only in the iron core lamina at the lowermost layer of the stator core 3, for example, it is possible to form the notch holes K at the same time with the punching (step (9)) for the crimping and separating holes C3 described in the first embodiment.

Third Embodiment

Figure 15:
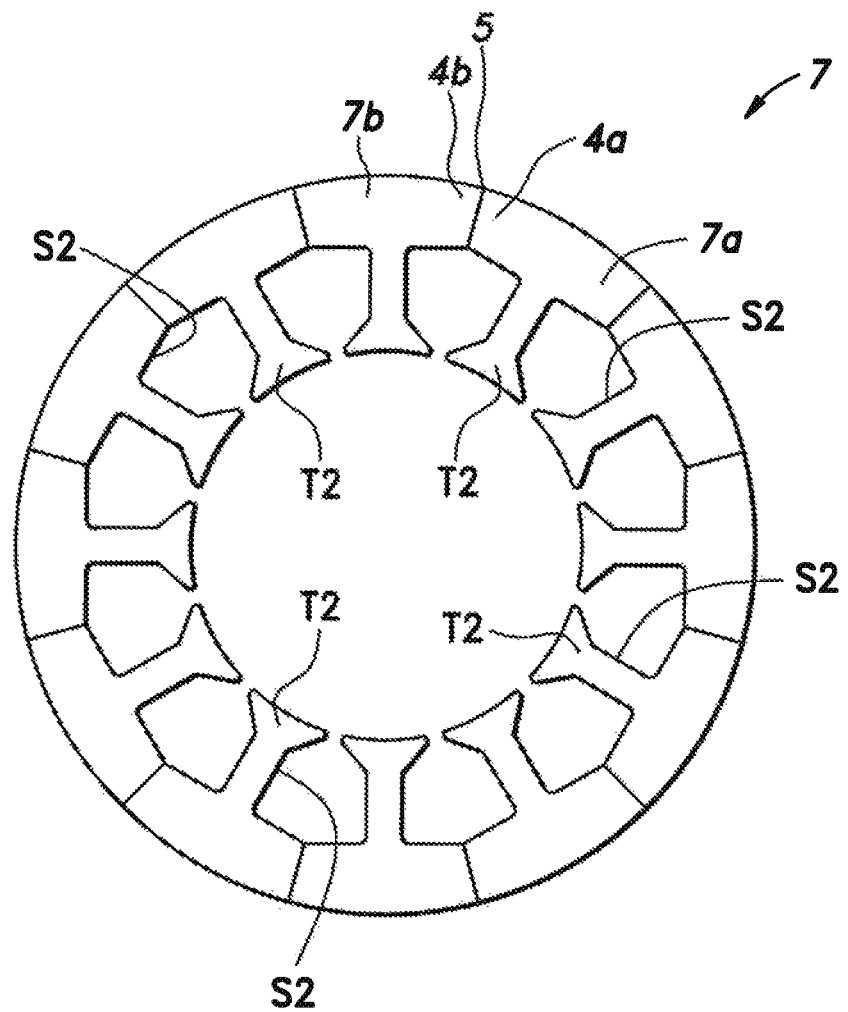
FIG. 15 is a plan view shoving a stator core piece according to the third embodiment.
Figure 16:
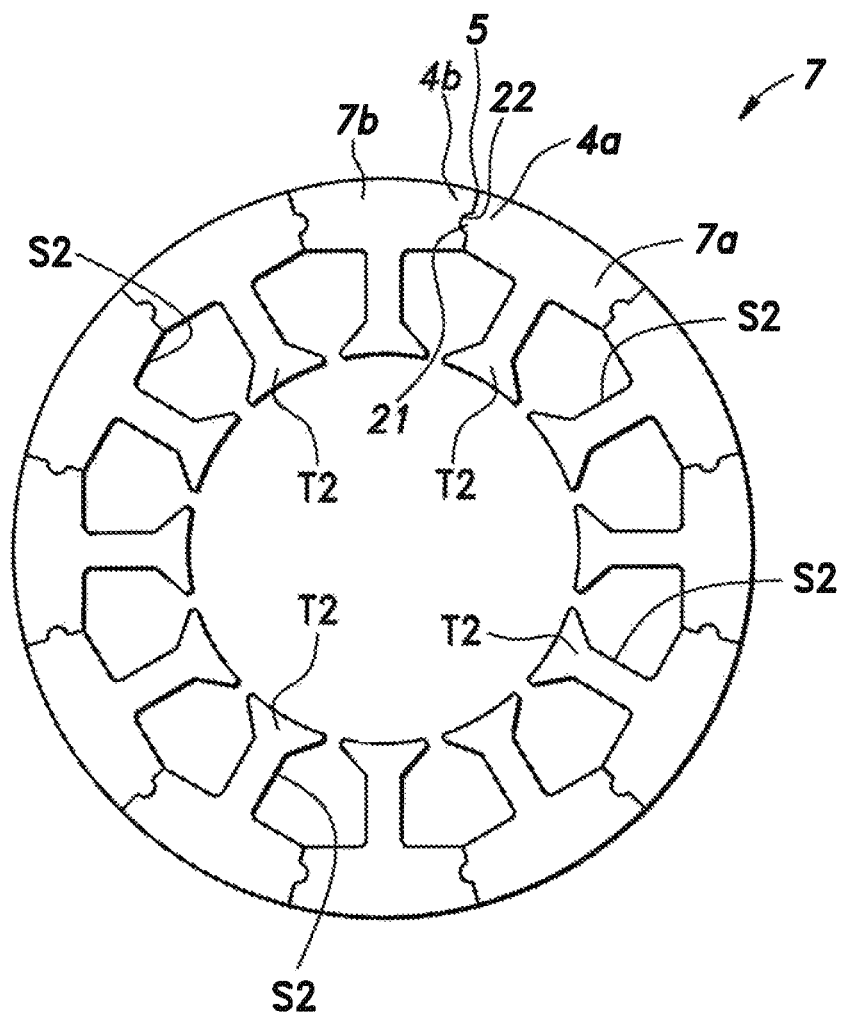
FIG. 16 is a plan view showing a stator core piece according to the third embodiment.

FIG. 15 and FIG. 16 are each a plan view showing a stator core piece according to the third embodiment of the present invention. In FIGS. 15 and 16, structural elements similar to those in the first or second embodiment are denoted by the same reference signs. Also, with regard to the third embodiment, elements that are not particularly mentioned in the following are the same as those in the above-described first or second embodiment, and a detailed description thereof is omitted.

In the above-described first and second embodiments, the progressive die machine 1 and the manufacturing method for the stator core 3 were configured so as to stack two types of stator core pieces 7 having mutually different connection strengths between the divided iron core pieces 7a, 7b, but the way of stacking such two types of stator core pieces 7 is not limited to these embodiments.

For example, as shown in FIGS. 15 and 16, it is possible to provide independent two punching steps (first and second connecting-portion punching steps) similar to step (8) in the first embodiment, to form two types of stator core pieces 7 having different shapes of the connecting portion 4. In this case, it is possible, for example, that in the first connecting-portion punching step, punching is performed to divide each connecting portion 4 along a straight dividing line 5 shown in FIG. 15, while in the second connecting-portion punching step, punching is performed to divide each connecting portion 4 along a curved dividing line 5 shown in FIG. 16 to form the first connecting end 4*a* of the first divided iron core piece 7*a* having the protruding portion 21 protruding in the circumferential direction and the second connecting end 4*b* of the second divided iron core piece 7*b* having the recessed portion 22 with a shape complementary to the protruding portion 21.

Thus, by providing a punching step corresponding to a different punching shape (here, shape of the dividing line 5) for the connecting portions 4 of some of the stator core pieces 7 constituting a single stator core 3, it is possible to stack two types of stator core pieces 7 having mutually different connection strengths between the divided iron core pieces 7*a*, 7*b*, similarly to the first and second embodiments.

Accordingly, by varying the numbers (composition ratio) and positions of the stator core pieces 7 shown in FIG. 15 and FIG. 16, the connection strength of the (entire) connecting portions 4 in the stator core 3 can be adjusted easily.

The present invention has been described in the foregoing based on the specific embodiments thereof, but these embodiments are for illustrative purposes only, and the present invention is not limited to these embodiments. For example, in the above embodiment, description was made of an example in which two types of iron core laminae having different connection strengths at the connecting portions were used, but the present invention is not limited to this, and the laminated iron core may be configured using three or more types of iron core laminae having different connection strengths at the connecting portions. Further, in the foregoing embodiments, the stacked iron core laminae were joined together by crimping, but the present invention is not limited to this, and the iron core laminae may be joined by means of an adhesive, laser welding, etc. Not all of the structural elements of the manufacturing method for a laminated iron core and the manufacturing device for a laminated iron core shown in the above embodiments regarding the present invention are necessarily indispensable, and they may be selectively used as appropriate at least without departing from the scope of the present invention.

GLOSSARY

1 progressive die machine manufacturing device for a laminated iron core)
3 stator core (laminated iron core)
4 connecting portion
4*a* first connecting end
4*b* second connecting end
5 dividing line
7 stator core piece (iron core lamina)
31 cam mechanism
40 partially punched piece
41 pushing plate
45 fully punched piece
51 slit
P1 to P12 punch

The invention claimed is:

1. A method for manufacturing a divided laminated iron core by punching iron core laminae from a sheet steel strip such that each iron core lamina includes a plurality of divided iron core pieces connected with each other in a circumferential direction, and stacking a plurality of the iron core laminae, wherein the iron core laminae include first iron core laminae and second iron core laminae, the method comprising:
   a first connecting-portion punching step of punching each of connecting portions between divided iron core pieces constituting each first iron core lamina, in the sheet steel strip;
   a second connecting-portion punching step of punching each of connecting portions between divided iron core pieces constituting each second iron core lamina, in the sheet steel strip; and
   a stacking step of stacking at least one of the first iron core laminae and at least one of the second iron core laminae and joining together the stacked iron core laminae,
   wherein a connection strength of the connecting portions between the divided iron core pieces of each first iron core lamina, achieved by the first connecting-portion punching step, is lower than a connection strength of the connecting portions between the divided iron core pieces of each second iron core lamina, achieved by the second connecting-portion punching step.

2. The manufacturing method for a divided laminated iron core according to claim 1, wherein the first connecting-portion punching step includes full punching for dividing each of the connecting portions of each first iron core lamina along a first dividing line, and
   the second connecting-portion punching step includes partial punching for dividing each of the connecting portions of each second iron core lamina along a second dividing line.

3. The manufacturing method for a divided laminated iron core according to claim 2, wherein the first dividing line consists of a straight line.

4. The manufacturing method for a divided laminated iron core according to claim 3, wherein a punching shape of the connecting portions of the first iron core laminae obtained by the first connecting-portion punching step is different from a punching shape of the connecting portions of the second iron core laminae obtained by the second connecting-portion punching step.

5. The manufacturing method for a divided laminated iron core according to claim 3, wherein one of the second iron core laminae is disposed at an uppermost or lowermost layer of the laminated iron core.

6. The manufacturing method for a divided laminated iron core according to claim 2, wherein a punching shape of the connecting portions of the first iron core laminae obtained by the first connecting-portion punching step is different from a punching shape of the connecting portions of the second iron core laminae obtained by the second connecting-portion punching step.

7. The manufacturing method for a divided laminated iron core according to claim 2, wherein one of the second iron core laminae is disposed at an uppermost or lowermost layer of the laminated iron core.

8. The manufacturing method for a divided laminated iron core according to claim 2, wherein the first connecting-portion punching step and the second connecting-portion punching step are performed by a same punch configured to selectively perform punching for the first connecting-portion punching step and punching for the second connecting-portion punching step.

9. The manufacturing method for a divided laminated iron core according to claim 1, wherein the first connecting-portion punching step includes punching for dividing each of the connecting portions of each first iron core lamina along a first dividing line, and the second connecting-portion punching step includes punching for forming a slit in each of the connecting portions of each second iron core lamina.

10. The manufacturing method for a divided laminated iron core according to claim 9, wherein the first dividing line consists of a straight line.

11. The manufacturing method for a divided laminated iron core according to claim 10, wherein a punching shape of the connecting portions of the first iron core laminae obtained by the first connecting-portion punching step is different from a punching shape of the connecting portions of the second iron core laminae obtained by the second connecting-portion punching step.

12. The manufacturing method for a divided laminated iron core according to claim 10, wherein one of the second iron core laminae is disposed at an uppermost or lowermost layer of the laminated iron core.

13. The manufacturing method for a divided laminated iron core according to claim 9, wherein a punching shape of the connecting portions of the first iron core laminae obtained by the first connecting-portion punching step is different from a punching shape of the connecting portions of the second iron core laminae obtained by the second connecting-portion punching step.

14. The manufacturing method for a divided laminated iron core according to claim 9, wherein one of the second iron core laminae is disposed at an uppermost or lowermost layer of the laminated iron core.

15. The manufacturing method for a divided laminated iron core according to claim 1, wherein a punching shape of the connecting portions of the first iron core laminae obtained by the first connecting-portion punching step is different from a punching shape of the connecting portions of the second iron core laminae obtained by the second connecting-portion punching step.

16. The manufacturing method for a divided laminated iron core according to claim 15, wherein one of the second iron core laminae is disposed at an uppermost or lowermost layer of the laminated iron core.

17. The manufacturing method for a divided laminated iron core according to claim 1, wherein one of the second iron core laminae is disposed at an uppermost or lowermost layer of the laminated iron core.

18. The manufacturing method for a divided laminated iron core according to claim 1, wherein the first connecting-portion punching step and the second connecting-portion punching step are performed by a same punch configured to selectively perform punching for the first connecting-portion punching step and punching for the second connecting-portion punching step.

19. A device for manufacturing a divided laminated iron core by punching iron core laminae from a sheet steel strip such that each iron core lamina includes a plurality of divided iron core pieces connected with each other in a circumferential direction, and stacking a plurality of the iron core laminae, wherein the iron core laminae include first iron core laminae and second iron core laminae, the device comprising:

a first connecting-portion punching section for punching connecting portions between divided iron core pieces constituting each first iron core lamina, in the sheet steel strip;

a second connecting-portion punching section for punching connecting portions between divided iron core pieces constituting each second iron core lamina, in the sheet steel strip; and a stacking section for stacking at least one of the first iron core laminae and at least one of the second iron core laminae ad joining together the stacked iron core laminae, wherein the first connecting-portion punching section and second connecting-portion punching section are configured such that a connecting portion has a lower connection strength if punched in the first connecting-portion punching section than if punched in the second connecting-portion punching section.

* * * * *